United States Patent [19]
Silvis et al.

[11] Patent Number: 5,681,897
[45] Date of Patent: *Oct. 28, 1997

[54] IMPACT MODIFICATION OF THERMOPLASTICS

[75] Inventors: H. Craig Silvis; Daniel J. Murray, both of Midland, Mich.; Thomas R. Fiske, Baton Rouge, La.; Stephen R. Betso, Horgen, Switzerland; Robert R. Turley, Lake Jackson, Tex.

[73] Assignee: The Dow Chemical Company, Midland, Mich.

[*] Notice: The term of this patent shall not extend beyond the expiration date of Pat. No. 5,278,272.

[21] Appl. No.: 468,695

[22] Filed: Jun. 6, 1995

Related U.S. Application Data

[60] Division of Ser. No. 45,330, Apr. 8, 1993, which is a continuation-in-part of Ser. No. 945,034, Sep. 15, 1992, abandoned.

[51] Int. Cl.$^6$ ............................................. C08F 8/00
[52] U.S. Cl. ..................... 525/150; 525/239; 525/240; 525/241; 525/242; 525/333.3; 525/455
[58] Field of Search ................................ 525/239, 240, 525/150, 333.3, 455, 241, 242

[56] References Cited

U.S. PATENT DOCUMENTS

| | | | |
|---|---|---|---|
| 3,645,992 | 2/1972 | Elston | 526/169.2 |
| 4,812,526 | 3/1989 | Rifi | 525/240 |
| 4,843,129 | 6/1989 | Spenadel et al. | 525/240 |
| 5,011,891 | 4/1991 | Spenadel et al. | 525/211 |
| 5,118,753 | 6/1992 | Hikasa et al. | 524/525 |
| 5,278,272 | 1/1994 | Lai et al. | 526/348.5 |

FOREIGN PATENT DOCUMENTS

| | | | |
|---|---|---|---|
| 684471 | 4/1964 | Canada | 400/91 |
| 141597 | 5/1985 | European Pat. Off. | C08F 210/16 |
| 294770B1 | 12/1988 | European Pat. Off. | |
| 294770A2 | 10/1991 | European Pat. Off. | |
| 942363 | 11/1963 | United Kingdom. | |
| 1065568 | 4/1967 | United Kingdom. | |

OTHER PUBLICATIONS

*Modern Plastics Encyclopedia*, vol. 65, No. 11, pp. 110 & 112, 1989 "Introduction to TPEs" by Charles D. Shedd.

*Modern Plastics Encyclopedia*, vol. 65, No. 11, p. 112, 1989, "Elastomeric Alloy TPEs", by C.P Rader.

*Modern Plastics Encyclopedia*, vol. 65, No. 11, pp. 112–113, 1989, "Engineering TPEs" by Thomas W. Sheridan.

"Flexomer ™ Polyolefins: A bridge between Polyethlylene and Rubbers" by M. R. Rifi, H.K.Ficker and M A Corwin, pp. 1–7 1990 Union Carbide CHemicals and Plastics Inc., Bound Brook New Jersey.

*Proceedings of the First International Business Forum of Speciality Polyolefins SPO'91*, Sep. 1991, pp. 41–55, "The Marketing Challenge by Single Site Catalysts in Polyolefins" by Michael Jefferies.

*Polyofefins VII International Conference*, pp. 45–66, Feb. 1991, "Structure Property Relationships in Exxpol ™ Polymers" by C.S Speed, B.C. Trudell, A Mehta and F C. stehling.

*Tappi Journal*, Feb. 1992, pp. 99–103, "A New Family of Linear Ethylene Polymers Provides Enhanced Sealing Performance" by Dirk G F. Van der Sanden and Richard W. Halle.

*Proceeddings of the 1991 IEEE Engineering Society*, pp. 184–190, Sep. 1990, "New Speciality Linear Polymers (SLP) For Power Cables" by Monica Hendewerk and Lawrence Spenadel.

Primary Examiner—Stevan A. Resan

[57] ABSTRACT

Compositions having good low temperature impact performance made from a thermoplastic (e.g., a polyolefin such as polypropylene) and either at least one linear ethylene/$C_5$–$C_{20}$ α-olefin or at least one substantially linear ethylene/$C_3$–$C_{20}$ α-olefin polymer are disclosed. The compositions are easily molded and have particular utility in making automotive facia, parts and other household articles.

14 Claims, 2 Drawing Sheets

IMPACT MODIFICATION OF THERMOPLASTICS

CROSS-REFERENCE TO RELATED APPLICATIONS

This application is a divisional of application Ser. No. 08/045,330 filed Apr. 8, 1993, which is a continuation-in-part of application Ser. No. 07/945,034, filed Sep. 15, 1992 now abandoned and is related to application Ser. No. 07/776, 130 now U.S. Pat. No. 5,272,236, filed Oct. 15, 1991, and to application Ser. No. 07/939,281, now U.S. Pat. No. 5,278, 272 filed Sep. 2, 1992, the disclosures of all of which are incorporated herein by reference.

FIELD OF THE INVENTION

This invention relates to improved impact modification of specific thermoplastic polymers and polymer blends. The polymers and polymer blends comprise at least one linear or substantially linear ethylene/α-olefin polymer. The substantially linear ethylene/α-olefin polymer blended with the thermoplastic has a melt flow ratio, $I_{10}/I_2$, greater than or equal to 5.63, and a molecular weight distribution, $M_w/M_n$, less than or equal to the quantity $(I_{10}/I_2 - 4.63.)$ Compositions consisting essentially of polypropylene and at least one substantially linear ethylene/α-olefin polymers comprising ethylene/1-octene copolymers are especially preferred. Such compositions have surprisingly good impact performance and clarity, especially at low temperatures.

BACKGROUND OF THE INVENTION

Many different polymers and materials have been added to specific polymers to enhance the impact strength of the overall composition. For example, U.S. Pat. No. 5,118,753 (Hikasa et al.), incorporated herein by reference, discloses thermoplastic elastomer compositions said to have low hardness and excellent flexibility and mechanical properties consisting essentially of a mixture of an oil-extended olefinic copolymer rubber and an olefinic plastic. The olefinic plastic is polypropylene or a copolymer of polypropylene and an α-olefin of 2 or more carbon atoms. *Modern Plastics Encyclopedia/89*, mid October 1988 Issue, Volume 65, Number 11, pp. 110–117, the disclosure of which is incorporated herein by reference, also discusses the use of various thermoplastic elastomers (TPEs) useful for impact modification. These include: elastomeric alloys TPEs, engineering TPEs, olefinic TPEs (also known as thermoplastic olefins or TPOs), polyurethane TPEs and styrenic TPEs.

Thermoplastic olefins (TPOs) are generally produced from blends of an elastomeric material such as ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. Generally, TPOs are characterized by a balance of stiffness (modulus) and low temperature impact, good chemical resistance and broad use temperatures. Because of features such as these, TPOs are used in many applications, including automotive facia and wire and cable operations.

Union Carbide Chemicals and Plastics Inc. announced in 1990 that they have developed a new cost effective class of polyolefins trademarked Flexomer™ Polyolefins that could replace expensive EPM or EPDM rubbers. These new polyolefins are said to have bridged the gap between rubbers and polyethylene, having moduli between the two ranges. Modulus of the rubber and of the formulation is not, however, the only criteria for evaluating a TPO formulation. Low temperature impact performance, sometimes measured by Gardner Impact at –30C. also is critical to a TPO composition's performance. According to the data contained in FIG. 4 of the paper "Flexomer™ Polyolefins: A Bridge Between Polyethylene and Rubbers" by M. R. Rifi, H. K. Ficker and M. A. Corwin, more of the Flexomer™ Polyolefin needs to be added into the TPO formulation in order to reach the same levels of low temperature Gardner Impact performance as the standard EPM rubber, thus somewhat negating the benefits of the lower cost EPM/EPDM replacement. For example, using the data of FIG. 4 of the Rifi et al paper, about 20% (by weight) of the EPM in polypropylene gives a Gardner Impact of about 22 J. at –30° C., while the same amount of Flexomer™ Polyolefin gives a –30° C. Gardner Impact of about 13 J.

In a paper presented on Sep. 24, 1991 at the 1991 Specialty Polyolefins conference (SPO '91) (pp. 43–55) in Houston, Tex., Michael P. Jeffries (Exxpol Ethylene Polymers Venture Manager of Exxon Chemical Company) also reports that Exxon's Exact™ polymers and Plastomers can be blended into polypropylene for impact modification. Exxon Chemical Company, in the Preprints of Polyolefins VII International Conference, page 45–66, Feb. 24–27 1991, also disclose that the narrow molecular weight distribution (NMWD) resins produced by their EXXPOL™ technology have higher melt viscosity and lower melt strength than conventional Ziegler resins at the same melt index. In another recent publication, Exxon Chemical Company has also taught that NMWD polymers made using a single site catalyst create the potential for melt fracture ("New Specialty Linear Polymers (SLP) For Power Cables," by Monica Hendewerk and Lawrence Spenadel, presented at IEEE meeting in Dallas, Tex., September, 1991).

It is well known that narrow molecular weight distribution linear polymers disadvantageously have low shear sensitivity or low $I_{10}/I_2$ value, which limits the extrudability of such polymers. Additionally, such polymers possessed low melt elasticity, causing problems in melt fabrication such as film forming processes or blow molding processes (e.g., sustaining a bubble in the blown film process, or sag in the blow molding process etc.). Finally, such resins also experienced surface melt fracture properties at relatively low extrusion rates thereby processing unacceptably and causing surface irregularities in the finished product.

Thus, while the development of new lower modulus polymers such as Flexomer™ Polyolefins by Union Carbide or Exact™ polymers by Exxon has aided the TPO marketplace, there continues to be a need for other more advanced, cost-effective polymers for compounding into polypropylene which improve or maintain low temperature impact performance and modulus.

SUMMARY OF THE INVENTION

Formulated compositions have now been discovered to have this combination of good low temperature impact performance and modulus. The compositions comprise:

A) a thermoplastic selected from the group consisting of thermoplastic polyurethanes, polyvinyl chlorides, styrenics, engineering thermoplastics, and polyolefins, and B) at least one linear or substantially linear ethylene/α-olefin polymer.

Both the substantially linear and the linear ethylene/α-olefin polymers are ethylene/α-olefin interpolymers having a short chain branching distribution index (SCBDI) greater than about 30 percent. Both the substantially linear and linear polymers have a single melting point, as opposed to traditional Ziegler polymerized polymers having two or more melting points (determined using differential scanning calorimetry (DSC)).

The substantially linear ethylene/α-olefin polymers are characterized as having:

a) a melt flow ratio, $I_{10}/I_2$, ≥5.63, b) a molecular weight distribution, $M_w/M_n$, defined by the equation: $M_w/M_n \leq (I_{10}/I_2)-4.63$, and c) a critical shear rate at onset of surface melt fracture of at least 50 percent greater than the critical shear rate at the onset of surface melt fracture of a linear olefin polymer having about the same $I_2$ and $M_w/M_n$.

The substantially linear ethylene/α-olefin polymer can also be characterized as having:

a) a melt flow ratio, $I_{10}/I_2$, ≥5.63, b) a molecular weight distribution, $M_w/M_n$, defined by the equation: $M_w/M_n \leq (I_{10}/I_2)-4.63$, and c) a processing index (PI) less than or equal to about 70% of the PI of a linear olefin polymer having about the same $I_2$ and $M_w/M_n$.

The formulated compositions have good low temperature impact performance (e.g., Dynatup Energy values at −20° F. for compositions containing about 30% by weight of the substantially linear olefin polymer of at least about 30 ft-lbs) and maintain adequate modulus, relative to a linear olefin polymer added at the about the same levels and at about the same $I_2$ and $M_w/M_n$.

DETAILED DESCRIPTION OF THE INVENTION

Figure 1:
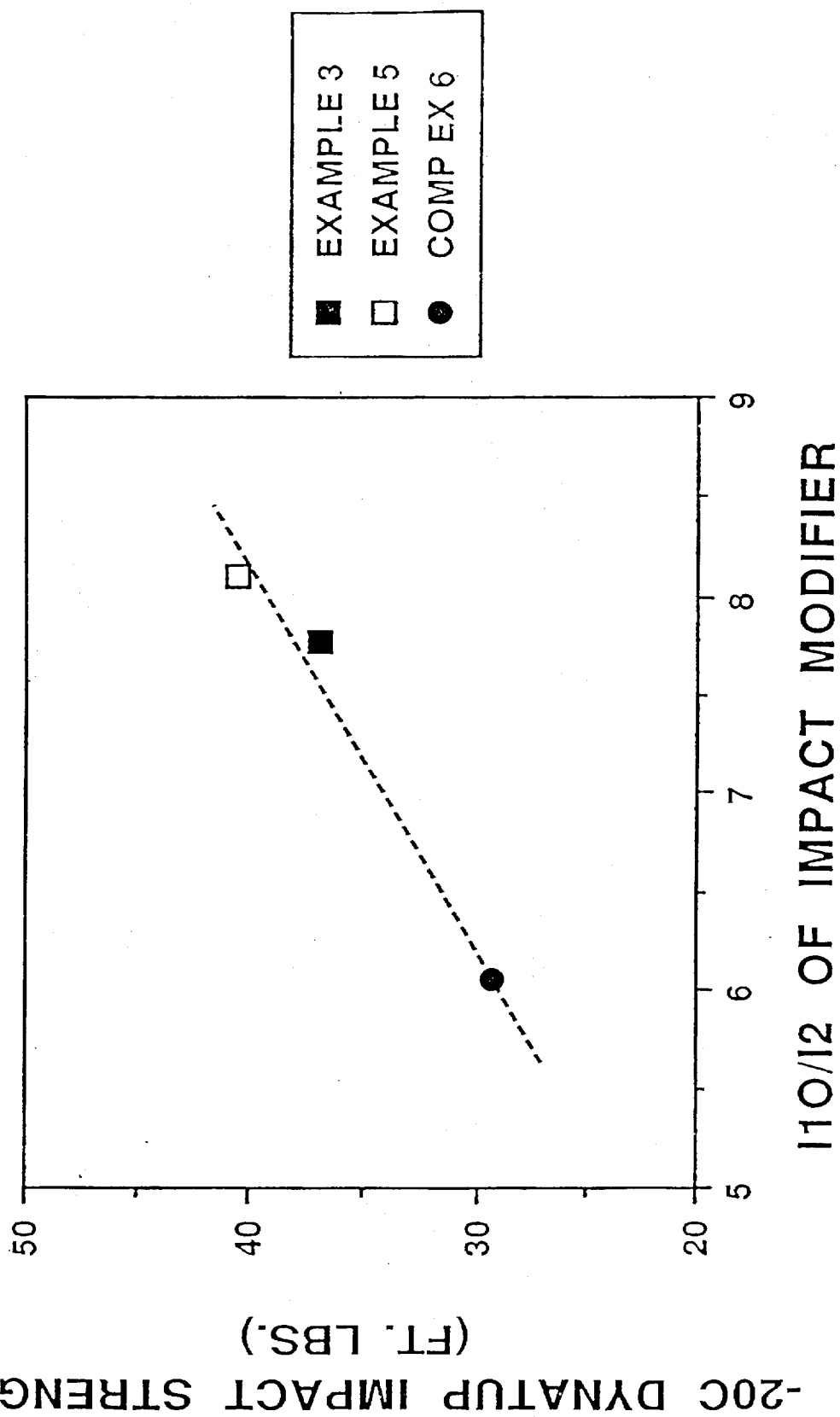
FIG. 1 describes the relationship between $I_{10}/I_2$ and −20° F. Dynatup Impact Strength from Example 1, Example 5 and from Comparative Example 6.

The term "linear ethylene/α-olefin polymers" means that the olefin polymer does not have long chain branching. That is, the linear ethylene/α-olefin polymer has an absence of long chain branching, as for example the linear low density polyethylene polymers or linear high density polyethylene polymers made using uniform branching (i.e., homogeneously branched) distribution polymerization processes (e.g., U.S. Pat. No. 3,645,992 (Elston), the disclosure of which is incorporated herein by reference) and are those in which the comonomer is randomly distributed within a given interpolymer molecule and wherein substantially all of the interpolymer molecules have the same ethylene/comonomer ratio within that interpolymer. The term "linear ethylene/α-olefin polymers" does not refer to high pressure branched polyethylene which is known to those skilled in the art to have numerous long chain branches. Typically, the linear ethylene/α-olefin polymer is an ethylene/α-olefin interpolymer, wherein the α-olefin is at least one $C_5$–$C_{20}$ α-olefin (e.g., 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_5$–$C_{20}$ α-olefin, especially an ethylene/1-octene copolymer.

The substantially linear ethylene/α-olefin interpolymers of the present invention are not in the same class as traditional linear ethylene/α-olefin polymers (e.g., heterogeneously branched linear low density polyethylene, linear high density polyethylene, or homogeneously branched linear polyethylene), nor are they in the same class as traditional highly branched low density polyethylene. The substantially linear olefin polymers useful in this invention surprisingly have excellent processability, even though they have relatively narrow molecular weight distributions. Even more surprising, the melt flow ratio ($I_{10}/I_2$) of the substantially linear olefin polymers can be varied essentially independently of the polydispersity index (i.e., molecular weight distribution ($M_w/M_n$)). This is contrasted with conventional heterogeneously branched linear polyethylene resins having rheological properties such that as the polydispersity index increases, the $I_{10}/I_2$ value also increases.

The term "substantially linear" ethylene/α-olefin polymers means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin polymers and interpolymers of the present invention are herein defined as in copending application Ser. No. 07/776,130 and in copending application Ser. No. 07/939,281 filed Sep. 2, 1992. The substantially linear ethylene/α-olefin polymers and interpolymers useful for blending with the thermoplastics (e.g., polypropylene) are those in which the comonomer is randomly distributed within a given interpolymer molecule and wherein substantially all of the interpolymer molecules have the same ethylene/comonomer ratio within that interpolymer.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference.

The substantially linear ethylene/α-olefin polymers or copolymers for use in impact modifying the selected thermoplastic or polyolefin (usually polypropylene) in the present invention are interpolymers of ethylene with at least one $C_3$–$C_{20}$ α-olefin and/or $C_4$–$C_{18}$ diolefins. Copolymers of ethylene and 1-octene are especially preferred. The term "interpolymer" is used herein to indicate a copolymer, or a terpolymer, or the like. That is, at least one other comonomer is polymerized with ethylene to make the interpolymer.

Other unsaturated monomers usefully copolymerized with ethylene include, for example, ethylenically unsaturated monomers, conjugated or nonconjugated dienes, polyenes, etc. Preferred comonomers include the $C_3$–$C_{20}$ α-olefins especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The density of the linear or substantially linear ethylene/α-olefin polymers or copolymers (as measured in accordance with ASTM D-792) for use in the present invention is generally from about 0.85 g/cm$^3$ to about 0.91 g/cm$^3$, preferably from about 0.86 g/cm$^3$ to about 0.9 g/cm$^3$, and especially from about 0.865 g/cm$^3$ to about 0.89 g/cm$^3$.

Generally, the amount of the linear or substantially linear ethylene/α-olefin polymer incorporated into the composition is from about 1 percent to about 99 percent, by weight of the composition, preferably about 10 percent to about 50 percent, by weight of the composition, and especially from about 15 percent to about 40 percent, by weight of the composition.

The molecular weight of the linear or substantially linear ethylene/α-olefin polymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the linear or substantially linear ethylene/α-olefin polymers useful herein is generally from about 0.01 grams/10 minutes (g/10 min) to about 20 g/10 min, preferably from about 0.1 g/10 min to about 10 g/10 min, and especially from about 0.5 g/10 min to about 8 g/10 min.

Another measurement useful in characterizing the molecular weight of the linear or the substantially linear ethylene/α-olefin polymers is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene/α-olefin polymers is preferably at least about 7, especially at least about 8. The $I_{10}/I_2$ ratio of the linear ethylene/α-olefin polymers is generally about 6.

Additives such as antioxidants (e.g., hindered phenolics (e.g., Irganox® 1010), phosphites (e.g., Irgafos® 168)), cling additives (e.g., PIB), antiblock additives, pigments, fillers, and the like can also be included in the TPO formulations, to the extent that they do not interfere with the enhanced formulation properties discovered by Applicants.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene/α-olefin polymers described herein, the PI is the apparent viscosity (in kpoise) of a material measured by GER at an apparent shear stress of 2.15×10$^6$ dyne/cm$^2$. The novel substantially linear ethylene/α-olefin polymers described herein preferably have a PI in the range of about 0.01 kpoise to about 50 kpoise, preferably about 15 kpoise or less. The novel substantially linear substantially linear ethylene/α-olefin polymers described herein have a PI less than or equal to about 70% of the PI of a comparative linear ethylene/α-olefin polymer at about the same $I_2$ and $M_w/M_n$.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene/α-olefin polymers is at least 50 percent greater than the critical shear rate at the onset of surface melt fracture of a linear ethylene/α-olefin polymer having about the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

Both the linear and substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin polymers used in the present invention is preferably greater than about 30 percent, especially greater than about 50 percent. The homogeneous ethylene/α-olefin polymers used in this invention essentially lack a measurable "high density" fraction as measured by the TREF technique (i.e., the homogeneous ethylene/α-olefin polymers do not contain a polymer fraction with a degree of branching less than or equal to 2 methyls/1000 carbons). The homogeneous ethylene/α-olefin polymers also do not contain any highly short chain branched fraction (i.e., the homogeneous ethylene/α-olefin polymers do not contain a polymer fraction with a degree of branching equal to or more than 30 methyls/1000 carbons).

Molecular Weight Distribution Determination of the Linear or Substantially Linear Ethylene/α-Olefin Polymers The linear and substantially linear ethylene/α-olefin interpolymer product samples are analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For the linear and substantially linear ethylene/α-olefin polymers, the $M_w/M_n$ is preferably from about 1.5 to about 2.5.

The Substantially Linear Ethylene/α-Olefin Polymers

The substantially linear ethylene/α-olefin polymers are made by using suitable constrained geometry catalysts, preferably constrained geometry catalysts as disclosed in U.S. application Ser. Nos.: 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference. The monocyclopentadienyl transition metal olefin polymerization catalysts taught in U.S. Pat. No. 5,026,798, the teachings of which are incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. No. 5,015,749, and/or U.S. Pat. No. 5,041,585, the disclosures of each of which are incorporated herein by reference) as well as inert, compatible, noncoordinating, ion forming compounds. Preferred cocatalysts are inert, noncoordinating, boron compounds.

Preparation of the Substantially Linear Ethylene/α-Olefin Polymer

The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers of the present invention, such as those disclosed in U.S. Pat. No. 3,914,342, incorporated herein by reference. The multiple reactors can be operated in series or in parallel, with at least one constrained geometry catalyst employed in one of the reactors.

The Thermoplastics which are Impact Modified

The thermoplastic polymers which are beneficially impact modified by the addition of the linear or substantially linear olefin polymers discussed herein can be thermoplastic polyurethanes (e.g., Pellathane™ or Isoplast™ made by The Dow Chemical Company), polyvinyl chlorides (PVCs), styrenics, polyolefins (including, e.g., ethylene carbon monoxide copolymers (ECO) or linear alternating ECO copolymers such as those disclosed by U.S. Ser. No. 08/009,198, filed Jan. 22, 1993 in the names of John G. Hefner and Brian W. S. Kolthammer, entitled "Improved Catalysts For The Preparation of Linear Carbon Monoxide/Alpha Olefin Copolymers," the disclosure of which is incorporated herein by reference, and ethylene/propylene carbon monoxide polymers (EPCO)), various engineering thermoplastics (e.g., polycarbonate, thermoplastic polyester, polyamides (e.g., nylon), polyacetals, or polysulfones). Generally the polyolefin polymers which are most frequently used are polyethylene (e.g., high density polyethylene, such as that produced by the slurry polymerization process) or polypropylene. Generally at least one polypropylene is more frequently useful in the compositions disclosed herein.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7% ethylene copolymerized with the propylene), however, can also be used in the TPO formulations disclosed herein. A complete discussion of various polypropylene polymers is contained in *Modern Plastics Encyclopedia/89*, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 35 g/10 min, preferably from about 0.5 g/10 min to about 25 g/10 min, and especially from about 1 g/10 min to about 20 g/10 min.

The formulations are compounded by any convenient method, including dry blending the individual components and subsequently melt mixing, either directly in the extruder used to make the finished article (e.g., the automotive part), or by pre-melt mixing in a separate extruder (e.g., a Banbury mixer).

There are many types of molding operations which can be used to form useful fabricated articles or parts from the TPO formulations disclosed herein, including various injection molding processes (e.g., that described in *Modern Plastics Encyclopedia/89*, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia/89*, Mid October 1988 Issue, Volume 65, Number 11, pp. 217-218, "Extrusion-Blow Molding", the disclosure of which is incorporated herein by reference) and profile extrusion. Some of the fabricated articles include automotive bumpers, facia, wheel covers and grilles, as well as other household and personal articles, including, for example, freezer containers.

Improved Clarity of Impact Modified Compositions

Freezer containers have a unique combination of desired attributes, including good impact at low temperatures (to prevent cracking the container if dropped) and good clarity with which to see the food. The compositions disclosed herein have this unique combination of good impact and good clarity and are believed to have particular utility for this application.

Good clarity is achieved by selecting at least one linear or substantially linear ethylene/α-olefin polymer which has a refractive index within 0.005 refractive index units from the refractive index of the thermoplastic to be modified, especially within 0.002 refractive index units typically measured at 589 nm. Generally, polypropylene has a refractive index from about 1.470 to about 1.515, e.g., clarified polypropylene homopolymer has a refractive index of about 1.5065 and clarified polypropylene random copolymer has a refractive index of about 1.5044 at 589 nm.

Refractive index is measured using an Abbe-3L Refractometer made by Milton Roy Company and operated at 589 nm (sodium "d" line). Samples are prepared for testing in the refractometer by injection molding the polymer in a BOY 30T injection molder to a thickness of about 0.125 inches. The samples tested for physical properties are prepared in the same manner and also at a thickness of about 0.125 inches.

Haze and transmittance values for injection molded disks are determined using a HunterLab Ultrascan™ Sphere Spectrocolorimeter equipped with a Halon® lined integrating sphere which provides a maximum reflectance of light and an optical sensor with a holographic diffraction grating polychromator which achieves a spectral scan of 375 nm to 750 nm using 5 nm measurement intervals. The sample specimen is placed in the transmission compartment as close to the sphere as possible. Two measurements are made, one with a white tile (which reflects all light) at the reflectance port and one with a light trap (which reflects no light) at the reflectance port. From these measurements the total (TT) and diffuse transmittances (DT) are determined. Percent haze=(DT/TT)(100).

EXAMPLE 1 AND COMPARATIVE EXAMPLE 2

Example 1 is a blend containing 30% (by weight of the total composition) of an ethylene/1-octene substantially linear olefin polymer having a density of about 0.87 g/cm$^3$, $I_2$ of about 1.5 gms/10 minutes, $I_{10}/I_2$ of about 7.78, $M_w/M_n$ of about 2, is compounded with Himont 6323 polypropylene (melt flow rate of 12 gms/10 minutes @ 230° C.) on a 20 mm Welding Engineers twin screw extruder with the heating zones set according to the temperatures in Table 1:

TABLE 1

| Zone | Temperature (°C.) |
|---|---|
| 1 (feed) | 165 |
| 2 | 175 |
| 3 | 190 |
| 4 | 195 |
| 5 | 200 |
| 6 | 200 |

The screw speed is 200 rpm and the die temperature is set at 200° C. The blend strand is cooled in a water bath and pelletized using a conventional chopper. Comparative example 2 containing 30% Vistalon™ 707 (an ethylene/propylene elastomer having a density of about 0.87 gm/cm$^3$ and $I_2$ of about 0.3 g/10 minutes sold commercially by Exxon Chemical Company) is compounded with the same polypropylene in a similar manner. Each compounded blend is injection molded on a Boy 30 ton injection molder set as described in Table 2:

TABLE 2

| Zone 1 | 170° C. |
|---|---|
| Zone 2 | 180° C. |
| Zone 3 | 190° C. |
| Nozzle | 200° C. |
| Injection pressure | 32 bars |
| Mold temperature | 50° C. |
| Cycle time | 20 seconds |

The mold used produced tensile and Dynatup test specimens simultaneously. Tensile and impact properties are then determined according to ASTM procedures and the results are shown in Table 3:

TABLE 3

| Property | Ex. 1 | Comp. Ex. 2 | 100% polypropylene |
|---|---|---|---|
| Weight % polymer added | 30 | 30 | NA |
| Yield Tensile (psi) | 3200 | 2720 | 5040 |
| Break Tensile (psi) | 2430 | 2370 | 2840 |
| Break Elongation (%) | >200 | >200 | 153 |
| Tensile Modulus (psi) | 159,000 | 146,700 | 244,700 |
| Notched Izod (ft-lb/in) | 11.1 | 2.5 | 0.1 |
| Dynatup Energy (ft-lb, 23° C.) | 28.8 (ductile) | 28.7 (ductile) | 14.8 (brittle) |
| Dynatup Energy (ft-lb, −20° F.) | 41.8 (ductile) | 12.4 (brittle) | 0.2 (brittle) |

NA = Not Applicable

As can be seen from the data, the substantially linear ethylene/1-octene polymer imparts much greater impact resistance to polypropylene (both notched Izod and −20 ° F. Dynatup) than a conventional commercial impact modifier such as the ethylene/propylene elastomer shown here. Equally important, these improved impact properties are achieved without any loss in modulus relative to the ethylene/propylene blend.

EXAMPLE 3 AND COMPARATIVE EXAMPLE 4

Example 3 is a blend containing 30% (by weight of the total composition) of the same ethylene/1-octene substantially linear olefin polymer used in Example 1 compounded with a polypropylene having a melt flow rate of 20 gms/10 minutes @ 230° C. Comparative Example 4 is a blend of 30% of a commercial ethylene-propylene diene monomer (EPDM) terpolymer elastomer sold by Uniroyal Chemical and trademarked Royalene™ 521 with the same 20 MFR polypropylene. Table 4 shows the resultant physical properties from these two blends:

TABLE 4

| Property | Ex. 3 | Comp. Ex. 4 |
|---|---|---|
| Weight % polymer added | 30 | 30 |
| Yield Tensile (psi) | 3240 | 2650 |
| Break Tensile (psi) | 2440 | 2120 |
| Break Elongation (%) | >200 | >200 |
| Tensile Modulus (psi) | 167,400 | 145,700 |
| Notched Izod (ft-lb/in) | 9.9 | 6.2 |
| Dynatup Energy (ft-lb, 23° C.) | 27.9 (ductile) | 28.0 (ductile) |
| Dynatup Energy (ft-lb, −20° F.) | 37.0 (ductile) | 29.6 (ductile/brittle) |

EXAMPLE 5 AND COMPARATIVE EXAMPLE 6

The substantially linear olefin polymers of the present invention also show enhanced impact modification relative to other linear elastomers derived from single site catalyst technology. Example 5 is a blend of 30% (by weight of the total composition) of an ethylene/1-octene substantially linear olefin polymer having a density of about 0.87 g/cm$^3$, $I_2$ of about 1 gms/10 minutes, $I_{10}/I_2$ of about 8.10, and $M_w/M_n$ of about 1.92 compounded with a polypropylene having a melt flow rate of 20 gms/10 minutes @ 230° C. Comparative Example 6 is a blend of 30% of a commercial ethylene/propylene copolymer sold by Mitsui Petrochemical and trademarked Tafmer™ P-0480 ($I_2$ of 1.1 g/10 minutes, $I_{10}/I_2$ of about 6.06, $M_w/M_n$ of about 1.9, a density of about 0.87 g/cm$^3$, PI of about 27.4 kPoise, and a critical shear rate at OSMF of about 105 sec$^{-1}$) with the same 20 MFR polypropylene. Table 5 shows the resultant physical properties from these two blends:

TABLE 5

| Property | Ex. 5 | Comp. Ex. 6 |
|---|---|---|
| Weight % polymer added | 30 | 30 |
| Yield Tensile (psi) | 2990 | 2920 |
| Break Tensile (psi) | 2250 | 2220 |
| Break Elongation (%) | >200 | >200 |
| Tensile Modulus (psi) | 152,600 | 151,400 |
| Notched Izod (ft-lb/in) | 10.8 | 5.7 |
| Dynatup Energy (ft-lb, 23° C.) | 29.9 (ductile) | 29.7 (ductile) |
| Dynatup Energy (ft-lb, −20° F.) | 40.5 (ductile) | 29.3 (ductile/brittle) |

FIG. 1 describes the relationship between $I_{10}/I_2$ and −20° F. Dynatup Impact Strength from Example 1, Example 5 and from Comparative Example 6. Compositions comprising substantially linear ethylene/α-olefin copolymers having higher $I_{10}/I_2$ values have higher −20° F. impact strength, versus that of a comparative polymer, even though all three polymers have about the same polydispersity ($M_w/M_n$).

EXAMPLE 7 AND COMPARATIVE EXAMPLE 8

Example 7 is a blend of 30% (by weight of the total composition) of an ethylene/1-octene substantially linear olefin polymer having a density of about 0.87 g/cm$^3$, $I_2$ of about 0.5 gms/10 minutes, $I_{10}/I_2$ of about 7.14, $M_w/M_n$ of about 1.9, a PI of about 26.2 kPoise and a critical shear rate at OSMF of about 108.7 sec$^{-1}$ compounded with a polypropylene having a melt flow rate of 20 gms/10 minutes @ 230° C. Comparative Example 8 is a blend of 30% of a commercial ethylene/propylene copolymer sold by Mitsui Petrochemical and trademarked Tafmer™ P-0680 ($I_2$ of about 0.4 g/10 minutes, $I_{10}/I_2$ of about 6.09, $M_w/M_n$ of about 1.8, a density of about 0.87 g/cm$^3$, PI of about 56.4 kPoise, and a critical shear rate at OSMF of about 52.8 sec$^{-1}$) with the same 20 MFR polypropylene. Table 6 shows the resultant physical properties from these two blends:

TABLE 6

| Property | Ex. 7 | Comp. Ex. 8 |
|---|---|---|
| Weight % polymer added | 30 | 30 |
| Yield Tensile (psi) | 3020 | 2930 |
| Break Tensile (psi) | 2350 | 2260 |
| Break Elongation (%) | >200 | >200 |
| Tensile Modulus (psi) | 151,100 | 151,400 |
| Notched Izod (ft-lb/in) | 12.2 | 8.4 |
| Dynatup Energy (ft-lb, 23° C.) | 31.7 (ductile) | 30.7 (ductile) |
| Dynatup Energy (ft-lb, −20° F.) | 46.0 (ductile) | 40.5 (ductile) |

EXAMPLE 9 AND COMPARATIVE EXAMPLE 10

Example 9 is a blend of 30% (by weight of the total composition) of the same ethylene/1-octene substantially linear olefin polymer used in Example 5 compounded with a polypropylene having a melt flow rate of 12 gms/10 minutes @ 230° C. Comparative Example 10 is a blend of 30% of a commercial ethylene/propylene copolymer sold by Mitsui Petrochemical and trademarked Tafmer™ P-0480 with the same 12 MFR polypropylene. Table 7 shows the resultant physical properties from these two blends:

TABLE 7

| Property | Ex. 9 | Comp. Ex. 10 |
|---|---|---|
| Weight % polymer added | 30 | 30 |
| Yield Tensile (psi) | 2980 | 2940 |
| Break Tensile (psi) | 2310 | 2320 |
| Break Elongation (%) | >200 | >200 |
| Tensile Modulus (psi) | 148,400 | 150,900 |
| Notched Izod (ft-lb/in) | 11.8 | 3.1 |
| Dynatup Energy (ft-lb, 23° C.) | 32.5 (ductile) | 25.6 (ductile) |

TABLE 7-continued

| Property | Ex. 9 | Comp. Ex. 10 |
|---|---|---|
| Dynatup Energy (ft-lb, −20° F.) | 47.4 (ductile) | 41.7 (ductile) |

EXAMPLE 11 AND COMPARATIVE EXAMPLE 12

Example 11 is a blend of 30% (by weight of the total composition) of the same ethylene/1-octene substantially linear olefin polymer used in Example 7 compounded with a polypropylene having a melt flow rate of 12 gms/10 minutes @ 230° C. Comparative Example 12 is a blend of 30% of a commercial ethylene/propylene copolymer sold by Mitsui Petrochemical and trademarked Tafmer™ P-0680 with the same 12 MFR polypropylene. Table 8 shows the resultant physical properties from these two blends:

TABLE 8

| Property | Ex. 11 | Comp. Ex. 12 |
|---|---|---|
| Weight % polymer added | 30 | 30 |
| Yield Tensile (psi) | 2990 | 3030 |
| Break Tensile (psi) | 2380 | 2440 |
| Break Elongation (%) | >200 | >200 |
| Tensile Modulus (psi) | 145,100 | 151,800 |
| Notched Izod (ft-lb/in) | 13.3 | 10.4 |
| Dynatup Energy (ft-lb, 23° C.) | 31.2 (ductile) | 27.1 (ductile) |
| Dynatup Energy (ft-lb, −20° F.) | 50.4 (ductile) | 44.8 (ductile) |

Figure 2:
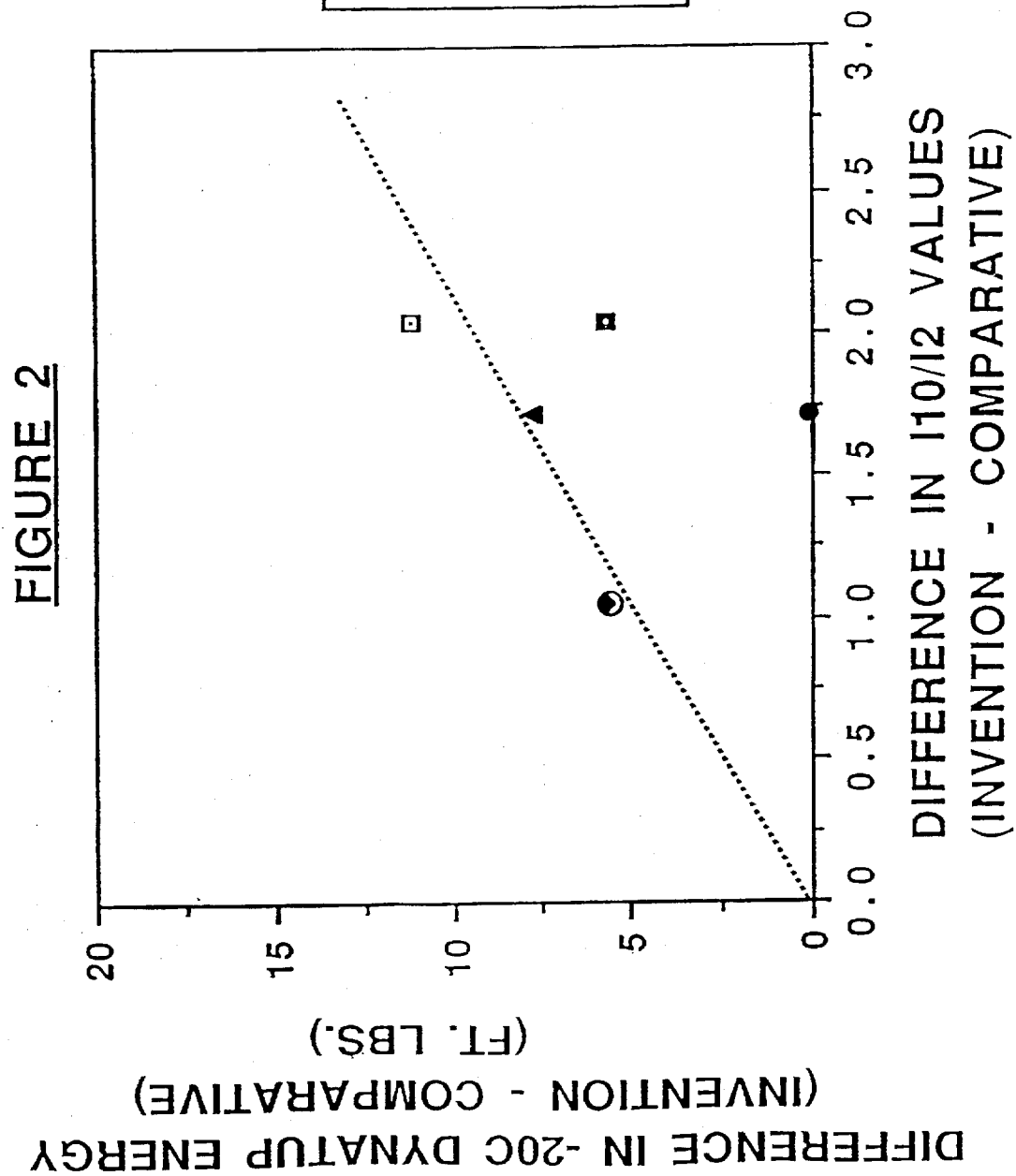
FIG. 2 describes the relationship between the difference between the $I_{10}/I_2$ of polymers used in the invention and those of comparative polymers, and the difference between the −20° F. Dynatup impact strength of compositions made using the polymers used in the invention and those made using the comparative polymers.

FIG. 2 plots the difference between the $I_{10}/I_2$ ratio versus the difference between the −20° F. Dynatup impact strength for the following sets of experiments: Example 5 minus Comparative Example 6*; Example 7 minus Comparative Example 8*; Example 9 minus Comparative Example 10*; Example 11 minus Comparative Example 12*; Example 1 minus Comparative Example 10*; and for Example 3—Comparative Example 6*. A general trend is observed whereby as the difference between the $I_{10}/I_2$ ratio of the polymer used in the composition increases, the difference between the −20° F. Dynatup energy of the ultimate formulated composition also increase, thus showing that the novel compositions used herein have improved properties over the comparative formulations.

EXAMPLES 13 AND 14 AND COMPARATIVE EXAMPLE 15

Each of Examples 13, 14 and Comparative Example 15 is a blend of 12%, 14%, 16%, and 18% (by weight of the total composition) of the selected polymer compounded with Himont polypropylene copolymer (SB751) having a melt flow rate of 35 gms/10 minutes @ 230° C. The polymer used in Example 13 is an ethylene/1-octene substantially linear olefin polymer having a density of about 0.857 g/cm³, and $I_2$ from about 0.9 gms/10 minutes to about 1.3 gms/10 minutes. The polymer used in Example 14 is an ethylene/1-octene substantially linear olefin polymer having a density of about 0.87 g/cm³, and $I_2$ from about 0.5 gms/10 minutes to about 1 gm/10 minutes. The polymer used in Comparative Example 15 is a commercial ethylene/propylene copolymer sold by Exxon Chemical and trademarked Vistalon™ 503 having a density of about 0.86 g/cm³, $I_2$ of about 0.2 gms/10 minutes and $I_{10}/I_2$ of about 15.8. Each of the samples is compounded with about 0.5 weight percent of a phenolic antioxidant and formed into 125 mil thick plaques by injection molding. Four samples are prepared for each blend and tested for low temperature Gardner drop impact, with the results averaged for each set of four samples. Table 9 shows the resultant low temperature Gardner drop impact data.

TABLE 9

| | Gardner drop impact (inch-lbs) @ −20° C. | Gardner drop impact (inch-lbs) @ −30° C. | Gardner drop impact (inch-lbs) @ −40° C. |
|---|---|---|---|
| Ex. 13 | | | |
| 12% | 320 | 264 | NM |
| 14% | NM | 320 | 296 |
| 16% | NM | 320 | 320 |
| 18% | NM | 320 | 320 |
| Ex. 14 | | | |
| 12% | 320 | 272 | NM |
| 14% | 320 | 320 | 304 |
| 16% | NM | 320 | 320 |
| 18% | NM | 320 | 320 |
| Comp. Ex. 15 | | | |
| 12% | 276 | 256 | NM |
| 14% | 320 | 312 | 312 |
| 16% | NM | 320 | 296 |
| 18% | NM | 320 | 320 |

NM = Not Measured

EXAMPLES 16 AND 17 AND COMPARATIVE EXAMPLE 18

Examples 16 and 17 are blends containing 30% and 20%, respectively, (by weight of the total composition) of an ethylene/1-octene substantially linear olefin polymer having a density of about 0.895 g/cm³, $I_2$ of about 1 gms/10 minutes, $I_{10}/I_2$ of about 8.8, $M_w/M_n$ of about 2.12, and a refractive index of about 1.502 is compounded with Amoco 8449 (copolymer polypropylene) having a melt flow rate of 12 gms/10 minutes @ 230° C. and a refractive index of about 1.5044, on a 20 mm Welding Engineers twin screw extruder with the heating zones set according to the temperatures in Table 10:

TABLE 10

| Zone | Temperature (°C.) |
|---|---|
| 1 (feed) | 170 |
| 2 | 180 |
| 3 | 190 |
| 4 | 200 |
| 5 | 210 |
| 6 | 210 |

The screw speed is 200 rpm and the die temperature is set at 210° C. The blend strand is cooled in a water bath and pelletized using a conventional chopper. Comparative example 17 is the same polypropylene evaluated as a comparative standard. Each sample is injection molded on a Boy 30 ton injection molder set as described in Table 11:

TABLE 11

| Zone 1 | 190° C. |
|---|---|
| Zone 2 | 200 |
| Zone 3 | 200 |
| Nozzle | 210 |
| Injection pressure | 24 bars |
| Mold temperature | 50° C. |
| Cycle time | 20 seconds |

The mold used produced tensile and Dynatup test specimens simultaneously. Tensile and impact properties are then determined according to ASTM procedures. The results are shown in Table 12:

TABLE 12

| Property | Ex. 16 | Ex. 17 | Comp. Ex. 18 (100% polypropylene) |
|---|---|---|---|
| Weight % polymer added | 30 | 20 | NA |
| Yield Tensile (psi) | 2690 | 3050 | 3950 |
| Break Tensile (psi) | 2210 | 2330 | 2580 |
| Break Elongation (%) | >200 | >200 | >200 |
| Tensile Modulus (psi) | 113,600 | 133,400 | 174,700 |
| Flexural Strength (psi) | 1920 | 2130 | 2780 |
| Flexural Modulus (psi) | 76,400 | 92,200 | 112,600 |
| Notched Izod (ft-lb/in) | 12.4 | 2.9 | 1.3 |
| Dynatup Energy (ft-lb, 23° C.) | 33.9 | 35.7 | 40.3 |
| Dynatup Energy (ft-lb, −20° F.) | 4.9 (brittle) | 0.3 (brittle) | 0.2 (brittle) |
| Transmittance (%) | 66 | 63 | 66 |
| Haze (%) | 74 | 73 | 67 |

NA = Not Applicable

As the data demonstrate, adding about 30 percent (by weight of the total composition) of a substantially linear ethylene/1-octene polymer improves the impact resistance to polypropylene (both notched Izod and −20° F. Dynatup). Since the difference between the refractive indices of the polyethylene and the polypropylene is about 0.0018 refractive index units, the improved impact properties are achieved without any loss in optical clarity relative to the polypropylene alone.

EXAMPLES 19 AND 20

Example 19 is a blend containing 20% (by weight of the total composition) of an ethylene/1-octene substantially linear olefin polymer having a density of about 0.886 g/cm$^3$, a melt index ($I_2$) of about 1 g/10 minutes, $I_{10}/I_2$ of about 8.02, $M_w/M_n$ of about 2.02, and a refractive index of about 1.496 is compounded with Amoco 8449 (copolymer polypropylene) having a melt flow rate of about 12 gms/10 minutes @ 230° C. Example 20 is a blend of 30% of the same ethylene/1-octene substantially linear olefin polymer with the same polypropylene. Table 13 shows the resultant physical properties from these two blends:

TABLE 13

| Property | Ex. 19 | Ex. 20 |
|---|---|---|
| Weight % polymer added | 20 | 30 |
| Yield Tensile (psi) | 3070 | 2600 |
| Break Tensile (psi) | 2330 | 2120 |
| Break Elongation (%) | >200 | >200 |
| Tensile Modulus (psi) | 137,700 | 114,700 |
| Flexural Strength (psi) | 2120 | 1750 |
| Flexural Modulus (psi) | 86,300 | 70,500 |
| Notched Izod (ft-lb/in) | 8.5 | 12.7 |
| Dynatup Energy (ft-lb, 23° C.) | 34.6 | 31.4 |
| Dynatup Energy (ft-lb, −20° F.) | 0.9 (brittle) | 34.1 (ductile/brittle) |
| Transmittance (%) | 57 | 59 |
| Haze (%) | 89 | 85 |

Since the difference between the refractive indices of the polyethylene and the polypropylene is about 0.0081 refractive index units, the improved impact properties are achieved with a slight loss in optical clarity relative to the polypropylene alone.

EXAMPLES 21 AND 22

Example 21 is a blend containing 20% (by weight of the total composition) of an ethylene/1-octene substantially linear olefin polymer having a density of about 0.87 g/cm$^3$ a melt index ($I_2$) of about 1 g/10 minutes, $I_{10}/I_2$ of about 7.8, $M_w/M_n$ of about 2.11, and a refractive index of about 1.485 is compounded with Amoco 8449 (copolymer polypropylene) having a melt flow rate of about 12 gms/10 minutes @ 230° C. Example 22 is a blend of 30% of the same ethylene/1-octene substantially linear olefin polymer with the same polypropylene. Table 14 shows the resultant physical properties from these two blends:

TABLE 14

| Property | Ex. 21 | Ex. 22 |
|---|---|---|
| Weight % polymer added | 20 | 30 |
| Yield Tensile (psi) | 2950 | 2430 |
| Break Tensile (psi) | 2260 | 2030 |
| Break Elongation (%) | >200 | >200 |
| Tensile Modulus (psi) | 136,500 | 109,900 |
| Flexural Strength (psi) | 2070 | 1650 |
| Flexural Modulus (psi) | 84,300 | 69,200 |
| Notched Izod (ft-lb/in) | 10.3 | 13 |
| Dynatup Energy (ft-lb, 23° C.) | 33.5 | 29.1 |
| Dynatup Energy (ft-lb, −20° F.) | 19.4 (brittle/ductile) | 44.8 (ductile) |
| Transmittance (%) | 45 | 44 |
| Haze (%) | 93 | 92 |

Since the difference between the refractive indices of the polyethylene and the polypropylene is about 0.0192 refractive index units, the improved impact properties are achieved, but there is greater loss in optical clarity relative to the polypropylene alone.

EXAMPLES 23-26 AND COMPARATIVE EXAMPLE 27

Examples 23-26 are blends containing 30%, 22.5%, 15% and 7.5%, respectively, (by weight of the total composition) of a first ethylene/1-octene substantially linear olefin polymer having a density of about 0.902 g/cm$^3$, $I_2$ of about 1 gms/10 minutes, $I_{10}/I_2$ of about 9.6, $M_w/M_n$ of about 1.91, and a refractive index of about 1.5075. Examples 24-26 also contain 6.5%, 15%, and 22.5%, respectively, of a second ethylene/1-octene substantially linear olefin polymer having a density of about 0.895 g/cm$^3$, $I_2$ of about 1 gms/10 minutes, $I_{10}/I_2$ of about 8.8, $M_w/M_n$ of about 2.12, and a refractive index of about 1.5026. The balance of each blend is Amoco 7239 (polypropylene homopolymer) having a melt flow rate of 12 gms/10 minutes @ 230° C. (ASTM D 1238, Condition 230/2.16 (formerly Condition L) and a refractive index of about 1.5065. Comparative example 27 is the polypropylene homopolymer alone.

The blends are compounded in a similar manner as described previously. Tensile and impact properties are determined from the resulting compositions according to ASTM procedures. The results are shown in Table 15:

TABLE 15

| Property | Ex. 23 | Ex. 24 | Ex. 25 | Ex. 26 | Comp. Ex. 27 (100% polyprop.) |
|---|---|---|---|---|---|
| Weight % 1st polymer added | 30 | 22.5 | 15 | 7.5 | NA |
| Weight % 2nd polymer added | 0 | 7.5 | 15 | 22.5 | NA |
| Yield Tensile (psi) | 4240 | 4180 | 4020 | 3860 | 5870 |
| Break Tensile (psi) | 2250 | 2690 | 2150 | 2760 | 4970 |
| Break Elongation (%) | 123 | 189 | 192 | 197 | 11 |
| Tensile Modulus (psi) | 227,200 | 225,700 | 214,700 | 206,400 | 313,000 |
| Flexural Strength (psi) | 3320 | 3530 | 3430 | 3310 | 5080 |
| Flexural Modulus (psi) | 140,100 | 146,400 | 144,100 | 135,000 | 218,500 |
| Notched Izod (ft-lb/in) | 1.2 | 1.2 | 1.4 | 7.0 | 0.6 |
| Dynatup Energy (ft-lb, 0° F.) | 1.0 | 1.3 | 4.6 | 7.4 | 0.2 |
| 0° F. Failure mode | brittle | brittle | brittle | brittle | brittle |
| Trans. (%) | 56 | 57 | 58 | 57 | 62 |
| Haze (%) | 81 | 82 | 79 | 85 | 69 |

NA = Not Applicable

As the data demonstrate, substantially linear ethylene copolymers can be blended to yield a desired refractive index in order to more closely match that of the polypropylene. Since the difference between the refractive indices of polyethylene blend (Example 25) and the polypropylene is about 0.0015 refractive index units, the improved impact properties are achieved with only marginal loss in optical clarity relative to the polypropylene alone.

EXAMPLES 28-30 AND COMPARATIVE EXAMPLE 31

Examples 28-30 are blends containing 30%, 35%, and 40%, respectively, (by weight of the total composition) of an ethylene/1-octene substantially linear olefin polymer having a density of about 0.895 g/cm$^3$, a melt index ($I_2$) of about 1 g/10 minutes, $I_{10}/I_2$ of about 8.8, $M_w/M_n$ of about 2.12, and a refractive index of about 1.5026. The ethylene/1-octene substantially linear olefin polymer is compounded with Amoco 7239 (polypropylene homopolymer) having a melt flow rate of about 12 gms/10 minutes @ 230° C. Comparative example 31 is the polypropylene alone. Table 16 shows the resultant physical properties from these two blends:

TABLE 16

| Property | Ex. 28 | Ex. 29 | Ex. 30 | Comp. Ex. 31 |
|---|---|---|---|---|
| Weight % Polymer added | 30 | 35 | 40 | NA |
| Yield Tensile (psi) | 3850 | 3660 | 3300 | 5870 |
| Break Tensile (psi) | 2730 | 2670 | 2530 | 4970 |
| Break Elongation (%) | >200 | >200 | >200 | 11 |
| Tensile Modulus (psi) | 207,700 | 193,700 | 173,400 | 313,000 |
| Flexural Strength (psi) | 3170 | 2830 | 2400 | 5080 |
| Flexural Modulus (psi) | 135,800 | 120,700 | 99,700 | 218,500 |
| Notched Izod (ft-lb/in) | 8.5 | 10.8 | 13.7 | 0.6 |
| Dynatup Energy (ft-lb, 0° F.) | 17.5 | 34.8 | 53.1 | 0.2 |
| 0° F. Failure Mode | brittle/ ductile | ductile | ductile | brittle |
| Trans. (%) | 58 | 59 | 59 | 62 |
| Haze (%) | 86 | 85 | 84 | 69 |

NA = Not Applicable

Since the difference between the refractive indices of the polyethylene and the polypropylene is about 0.0039 refractive index units, the improved impact properties are achieved with only a small loss in optical clarity, while the notched Izod and Dynatup Energy is increased significantly, relative to the polypropylene alone.

EXAMPLES 32 AND 33

Example 32 is a blend containing 70 percent (by weight of the final composition) of a polypropylene homopolymer (melt flow rate of about 12 g/10 minutes at 230° C.) and 30 percent (by weight of the final composition) of a substantially linear ethylene/1-octene copolymer (melt index of about 3 g/10 minutes at 190° C., density of about 0.87 g/cm$^3$, $I_{10}/I_2$ of about 7.6 and $M_w/M_n$ of about 1.95). The blend is compounded, injection molded and tested for physical properties.

Example 33 is a blend containing 70 percent (by weight of the final composition) of a polypropylene homopolymer (melt flow rate of about 12 g/10 minutes at 230° C.), 17 percent (by weight of the final composition) of a first substantially linear ethylene/1-octene copolymer (melt index of about 7 g/10 minutes at 190° C., density of about 0.87 g/cm$^3$, $I_{10}/I_2$ of about 7.7 and $M_w/M_n$ of about 1.92) and 13 percent (by weight of the final composition) of a second substantially linear ethylene/1-octene copolymer (melt index of about 1 g/10 minutes at 190° C., density of about 0.87 g/cm$^3$, $I_{10}/I_2$ of about 7.8 and $M_w/M_n$ of about 2.11). This combination of substantially linear ethylene/1-octene copolymers yields a net melt index of about 3 g/10 minutes (calculated according to the following equation: log (melt index)$_{blend}$=(0.567)(log 7)+(0.433)(log 1)). This blend is also compounded, injection molded and tested for physical properties. Table 17 summaries the physical properties results:

TABLE 17

| Property | Ex. 32 | Ex. 33 |
| --- | --- | --- |
| Yield Tensile (psi) | 3080 | 2850 |
| Break Tensile (psi) | 2290 | 2080 |
| Tensile Modulus (psi) | 149,600 | 152,700 |
| Notched Izod (ft-lb/in) | 6.8 | 9.1 |
| Dynatup Energy (ft-lb, −20° F.) | 1.9 | 46.2 |
| −20° F. Failure Mode | brittle | ductile |

As the data demonstrate, a blend of substantially linear ethylene polymers improves the −20° F. Dynatup Energy value by over 40 ft-lbs and improves the notched Izod of the composition by over 2 ft-lb/in., even though the net melt index of the combination of substantially linear ethylene/1-octene copolymers is about the same as that of a single substantially linear ethylene polymer.

We claim:

1. A thermoplastic olefinic polymer composition having a Dynatup impact performance of at least about 30 ft-lbs at a temperature of −20° F. comprising:

(A) a thermoplastic selected from the group consisting of thermoplastic polyurethanes, polyvinyl chlorides, styrenics, polycarbonate, thermoplastic polyester, polyamides, polyacetals, polysulfones, and polyolefins, (B) about 30 percent by weight of at least one substantially linear ethylene/α-olefin/diene interpolymer characterized as having:

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63, \text{ and}$$

c) a critical shear rate at onset of surface melt fracture of at least 50 percent greater than the critical shear rate at the onset of surface melt fracture of a linear ethylene/α-olefin/diene polymer having about the same $I_2$ and $M_w/M_n$.

2. A thermoplastic olefinic polymer composition having a Dynatup impact performance of at least about 30 ft-lbs at a temperature of −20° F. comprising:

(A) a thermoplastic selected from the group consisting of thermoplastic polyurethanes, polyvinyl chlorides, styrenics, polycarbonate, thermoplastic polyester, polyamides, polyacetals, polysulfones, and polyolefins, (B) about 30 percent by weight of at least one substantially linear ethylene/α-olefin/diene interpolymer characterized as having:

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63, \text{ and}$$

c) a processing index less than or equal to about 70 percent of the PI of a linear ethylene/α-olefin/diene polymer having about the same $I_2$ and $M_w/M_n$.

3. A thermoplastic olefinic polymer composition having a Dynatup impact performance of at least about 30 ft-lbs at a temperature of −20° F. comprising:

(A) a thermoplastic selected from the group consisting of thermoplastic polyurethanes, polyvinyl chlorides, styrenics, polycarbonate, thermoplastic polyester, polyamides, polyacetals, polysulfones, and polyolefins, (B) about 30 percent by weight of at least one substantially linear ethylene/α-olefin/diene interpolymer characterized as having:

a) a melt flow ratio, $I_{10}/I_2$, $\geq 5.63$, and a molecular weight distribution, $M_w/M_n$, from about 1.5 to about 2.5.

4. The composition of claims 1, 2, or 3 wherein the $I_{10}/I_2$ of the substantially linear ethylene/α-olefin polymer is at least about 7.

5. The composition of claims 1, 2, or 3 wherein the $I_{10}/I_2$ of the substantially linear ethylene/α-olefin polymer is at least about 8.

6. The composition of claims 1, 2, or 3 wherein the substantially linear ethylene/α-olefin polymer is a copolymer of ethylene and at least one $C_3$–$C_{20}$ α-olefin.

7. The composition of claims 1, 2, or 3 wherein the substantially linear ethylene/α-olefin polymer is a copolymer of ethylene and at least one $C_4$–$C_{20}$ α-olefin.

8. The composition of claims 1, 2, or 3 wherein the substantially linear ethylene/α-olefin polymer is a copolymer of ethylene and at least one $C_8$–$C_{20}$ α-olefin.

9. The composition of claims 1, 2, or 3 wherein the substantially linear ethylene/α-olefin polymer is a copolymer of ethylene and 1-octene.

10. The composition of claims 1, 2, or 3 wherein the substantially linear ethylene/α-olefin polymer has from about 0.01 to about 3 long chain branches/1000 carbons along the polymer backbone.

11. The composition of claims 1, 2, or 3 wherein the polyolefin is polypropylene.

12. The composition of claims 1, 2, or 3 wherein the polyolefin is polypropylene and wherein the substantially linear ethylene/α-olefin polymer is further characterized as having a refractive index within about 0.005 refractive index units of the refractive index of the polypropylene.

13. A fabricated article made from the composition of claims 1, 2, or 3.

14. The fabricated article of claim 13, wherein the fabricated article is selected from the group consisting of automotive bumpers, facia, wheel covers, grills, and freezer containers.

* * * * *